United States Patent [19]

Han

[11] Patent Number: 5,293,783
[45] Date of Patent: Mar. 15, 1994

[54] DIFFERENTIAL POWER TRANSMISSION DEVICE FOR TAPE RECORDERS

[75] Inventor: Yong H. Han, Kyungki, Rep. of Korea

[73] Assignee: Goldstar Co., Ltd., Rep. of Korea

[21] Appl. No.: 792,443

[22] Filed: Nov. 15, 1991

[30] Foreign Application Priority Data

Dec. 4, 1990 [KR] Rep. of Korea .............. 19866/1990

[51] Int. Cl.⁵ .............................................. F16H 57/00
[52] U.S. Cl. ...................................... 74/405; 74/337.5; 360/74.1
[58] Field of Search ................. 74/329, 335, 337.5, 74/405, 406; 192/89 A, 18 R, 33 R; 360/74.1, 75

[56] References Cited

U.S. PATENT DOCUMENTS

| | | | |
|---|---|---|---|
| 3,918,093 | 11/1975 | Seale-Finch | 360/96 |
| 4,196,874 | 4/1980 | Ohara | 360/74.1 X |
| 4,319,495 | 3/1982 | Salicini | 74/405 |

FOREIGN PATENT DOCUMENTS

| | | |
|---|---|---|
| 0381058 | 8/1990 | European Pat. Off. . |
| 0395299 | 10/1990 | European Pat. Off. . |
| 2914032 | 10/1979 | Fed. Rep. of Germany . |
| 2224876 | 5/1990 | United Kingdom . |

*Primary Examiner*—Allan D. Herrmann
*Attorney, Agent, or Firm*—Ostrolenk, Faber, Gerb & Soffen

[57] ABSTRACT

A differential power transmission device used for digital audio tape recorders and video cassette tape recorders. The device comprises a connecting gear adapted to move vertically for selectively engaging with a driving pulley gear, so as to selectively transmit the rotation force of the pulley gear to a driven gear. A vertical pivot member is provided for vertically moving the connecting gear so as to engage it with the pulley gear, so that the driven gear is driven by the rotation force of the pulley gear transmitted via the connecting gear. With this arrangement, the rotation force of the pulley gear can be more surely transmitted to the driven gear, without any malfunction.

2 Claims, 6 Drawing Sheets

DIFFERENTIAL POWER TRANSMISSION DEVICE FOR TAPE RECORDERS

BACKGROUND OF THE INVENTION

1. Field of the Invention

The present invention realtes to a differential power transmission device for tape recorders such as digital audio tape recorders and video cassette tape recorders, and more particularly to a differential transmission device wherein the rotation force of a drive motor can be more surely transmitted to a driven gear.

2. Description of the Prior Art

Referring to FIGS. 1A and 1B, there is shown a differential power transmission device generally used for tape recorders such as digital audio tape recorders(-hereinafter, referred to as DAT) and video cassette tape recorders(hereinafter, referred to as VCR). As shown in the drawings, the differential power transmission device comprises a pulley gear 4 rotatably mounted to a shaft 2 fixed to a main base 1 of a recorder deck body(not shown) and adapted to receive the drive force of a drive motor(not shown) by means of a belt 3 connected between the pulley gear 4 and the shaft of the drive motor, an upper gear 6 fixedly mounted to a shaft 5 rotatably mounted to a second main base 1' of the recorder deck body, the upper gear having a large diameter gear portion 6a always engaging with the pulley gear 4 and a small diameter gear portion 6b, a lower gear 7 rotatably mounted to the shaft 5 and having the same diameter as that of the small diameter gear portion 6b of the upper gear 6, and a driven gear 9 rotatably mounted to a shaft 8 fixed to one side of a third main base 1" of the recorder deck body, the driven gear always engaging with the lower gear 7. A boss 12 is rotatably mounted to a shaft 10 fixed to the other side of the third main base 1". The boss 12 has at its lower portion a support plate 11 which is provided at its opposite sides with engaging pieces 11a and 11b. Around the boss 12, a torsion spring 13 is fitted and supported at its both ends to engaging pieces 11a and 11b, respectively. To one side of the support plate 11, namely the engaging piece 11b, a tension coil spring 14 is connected which is adapted to always urge the support plate 11 to rotate about the shaft 10 in clockwise. The differential power transmission device also comprises a connecting gear 16 rotatably mounted to a shaft 15 fixed to the protion of support plate 11 opposite to the engaging piece 11b. The connecting gear 16 is selectively engaged with both the small gear portion 6b of the upper gear 6 and the lower gear 7, so as to transmit the rotation force of the pulley gear 4 to the driven gear 9. To the rear portion of the recorder deck body, a middle plate 17 is fixedly mounted. to which an operating plate 18 is mounted to reciprocate laterally. The operating plate 18 has at its one end a foot piece 18a.

The conventional differential power transmission device having the above-mentioned construction is designed to transmit the drive force of drive motor to the driven gear 9, only when the transmission is required. Under the condition that the foot piece 18a is disposed apart from the end 13b of the torsion spring 13, as shown in FIGS. 1A and 1B, the support plate 11 is urged to rotate about the shaft 10 in clockwise, by virtue of the tension force of the tension coil spring 14. As a result, the connecting gear 16 is maintained to be disengaged from both the small gear portion 6b of the upper gear 6 and the lower gear 7, thereby preventing the drive force of drive motor from being transmitted to the driven gear 9.

As the operating plate 18 is moved in the direction indicated by the arrow A in FIG. 1A, according to an operation mode reversal from the above-mentioned condition, the operating plate 18 pushes the end 13b of the torsion spring 13 by its foot piece 18a. At this time, the shifted amount of the torsion spring 13 functions as the force rotating the support plate 11 about the shaft 10 in anti-clockwise. As a result, the connecting gear 16 is engaged with both the small gear portion 6b of the upper gear 6 and the lower gear 7, so that the rotation force of the pulley gear 4 can be transmitted to the driven gear 9, via the upper gear 6 and the lower gear 7.

In the power transmission device, however, the small gear portion 6b of the upper gear 6 and the lower gear 7 which are simultaneously engaged with the connecting gear 16 may not be aligned with each other, as shown in FIG. 3, thereby interfering with their smooth engagement with the connecting gear 16. As a result, the upper gear 6 may be idly rotated.

SUMMARY OF THE INVENTION

Therefore, an object of the invention is to provide a differential power transmission device for a tape recorder wherein a connecting gear is provided which is vertically movable to selectively engage with both the pulley gear and the driven gear in desired operation modes, thereby enabling the rotation force of the pulley gear to be more surely transmitted to the driven gear, without any malfunction.

In accordance with the present invention, this object is accomplished by providing a differential power transmission device for a tape recorder comprising: a main base; a pulley gear rotatably mounted to the main base and driven by drive means; a connecting gear rotatably mounted to the main base to move vertically for selectively engaging with the pulley gear; a driven gear rotatably mounted to the main base to selectively receive the rotation force of the pulley gear via the connecting gear; and lifting member adapted to vertically move the connecting gear so as to engage it with the pulley gear, so that the driven gear is driven by the rotation force of the pulley gear transmitted via the connecting gear.

In one aspect of the present invention, the connecting gear comprises a large diameter gear portion selectively engaging with the pulley gear and a small diameter gear portion integrally rotating with the large diameter gear portion and always engaging with the driven gear. On the other hand, the lifting member comprises a vertical pivot member pivotally mounted to a middle plate fixed to a recorder deck body, the vertical pivot member having one end inserted in a groove formed at one end of a support plate functioning as an operating member and the other end engaged in an engaging groove formed at the upper portion of the connecting gear. As the vertical pivot member pivots by the movement of the support plate, it lifts the connecting gear so that the large diameter gear portion thereof is engaged with the pulley gear, thereby enabling the rotation force of the pulley gear to be transmitted to the driven gear. In the case of no movement of the support plate, the connecting gear is lowered by virtue of its weight and maintained at the position where it is disengaged from the pulley gear, thereby preventing the rotation of the pulley gear from being transmitted to the driven gear.

BRIEF DESCRIPTION OF THE DRAWINGS

Other object and aspects of the invention will become apparent from the following description of embodiments with reference to the accompanying drawings in which.

DETAILED DESCRIPTION OF THE PREFERRED EMBODIMENTS

Figure 1A:
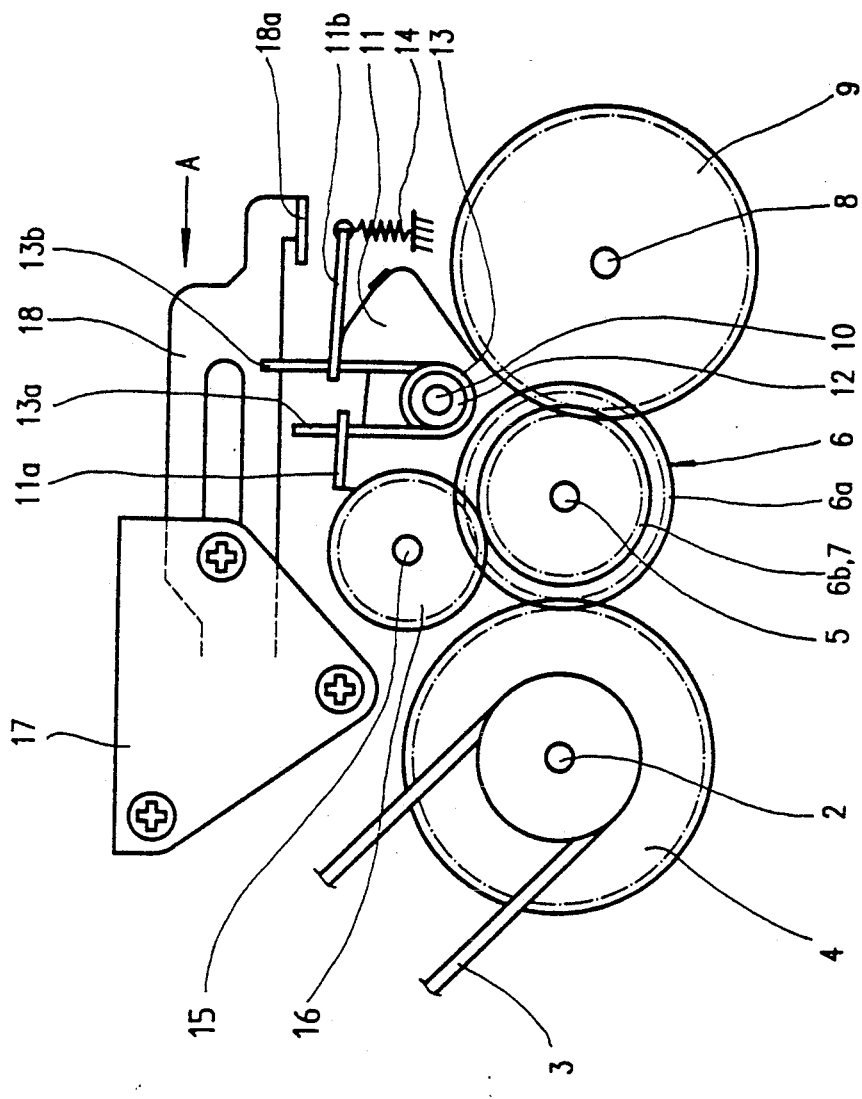
FIGS. 1A and 1B are a plan view and a partially sectional view of a conventional differential power transmission device, respectively, showing the disengagement condition of its connecting gear.
Figure 1B:
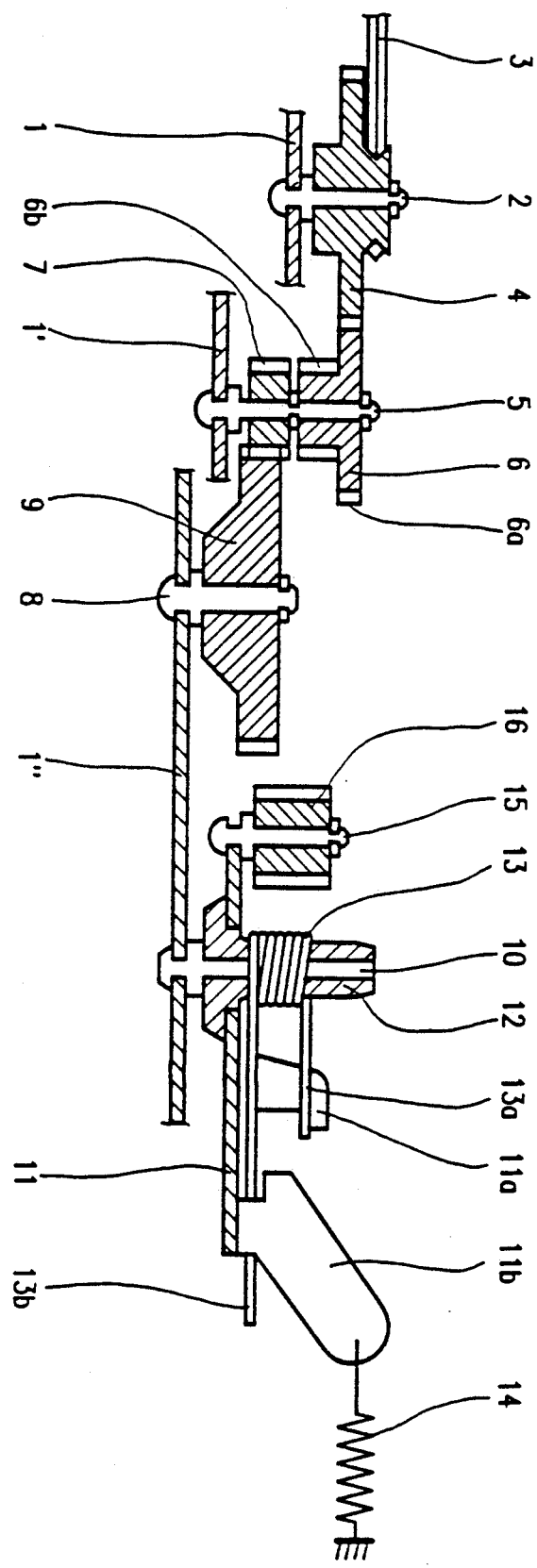
Figure 2:
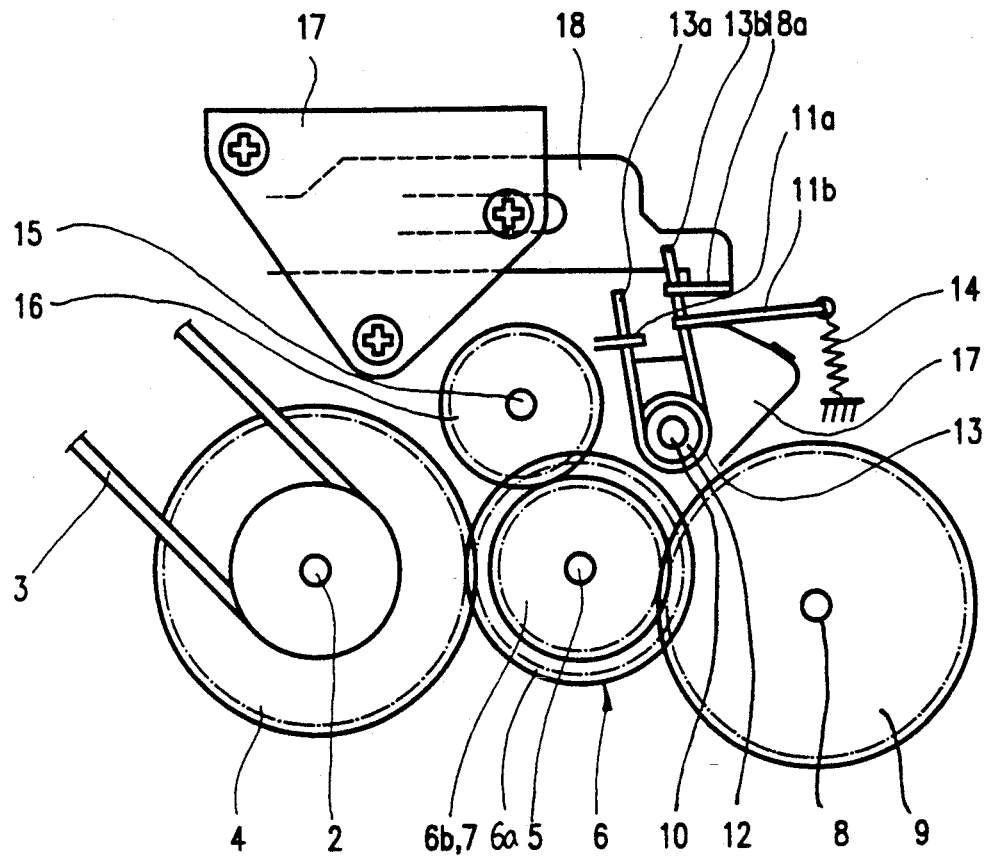
FIG. 2 is a plan view similar to FIG. 1A, showing the engagement condition of its connecting gear.
Figure 3:
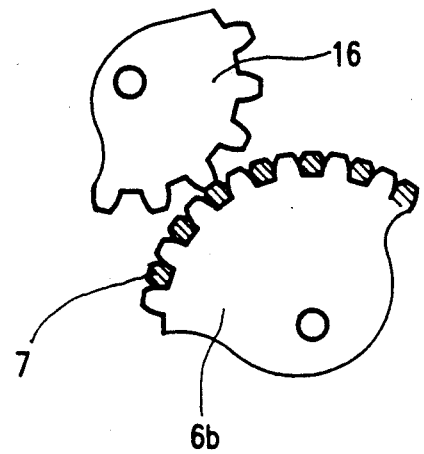
FIG. 3 is a schematic view explaining a problem encountered in the conventional device.
Figure 4A:
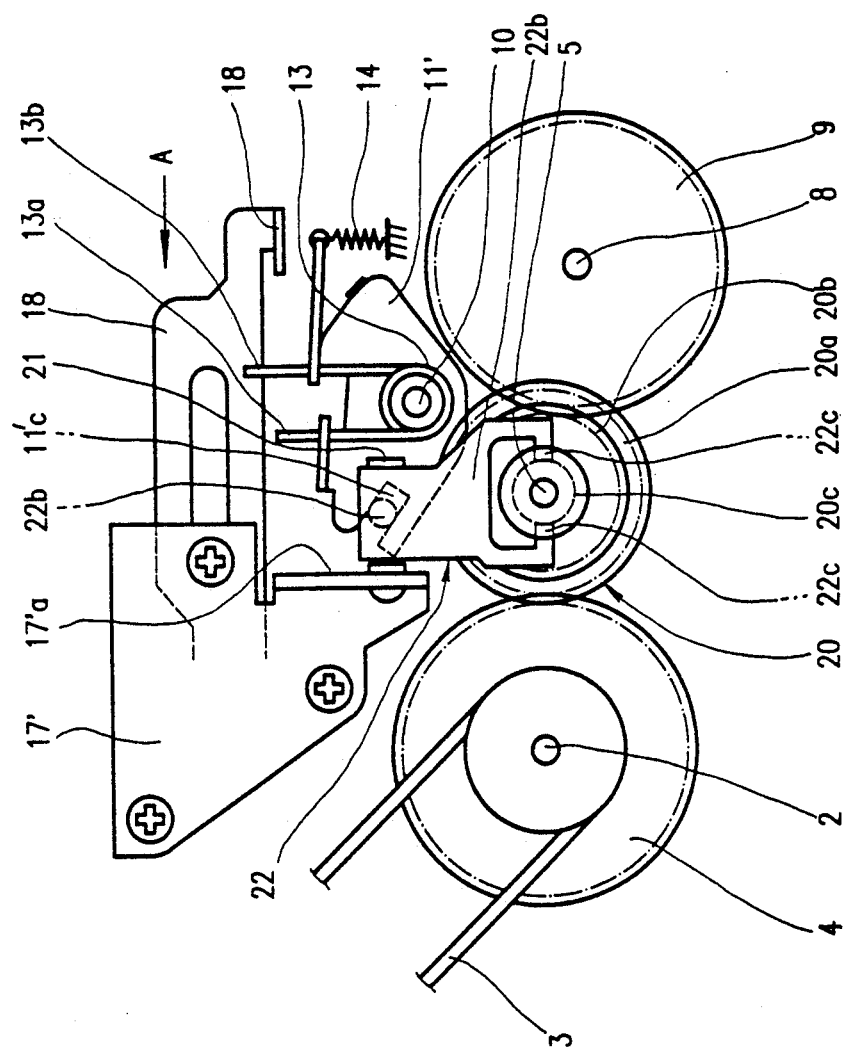
FIGS. 4A and 4B are a plan view and a partially sectional view of a differential power transmission device according to the present invention, respectively, showing the disengagement condition of its connecting gear.
Figure 4B:
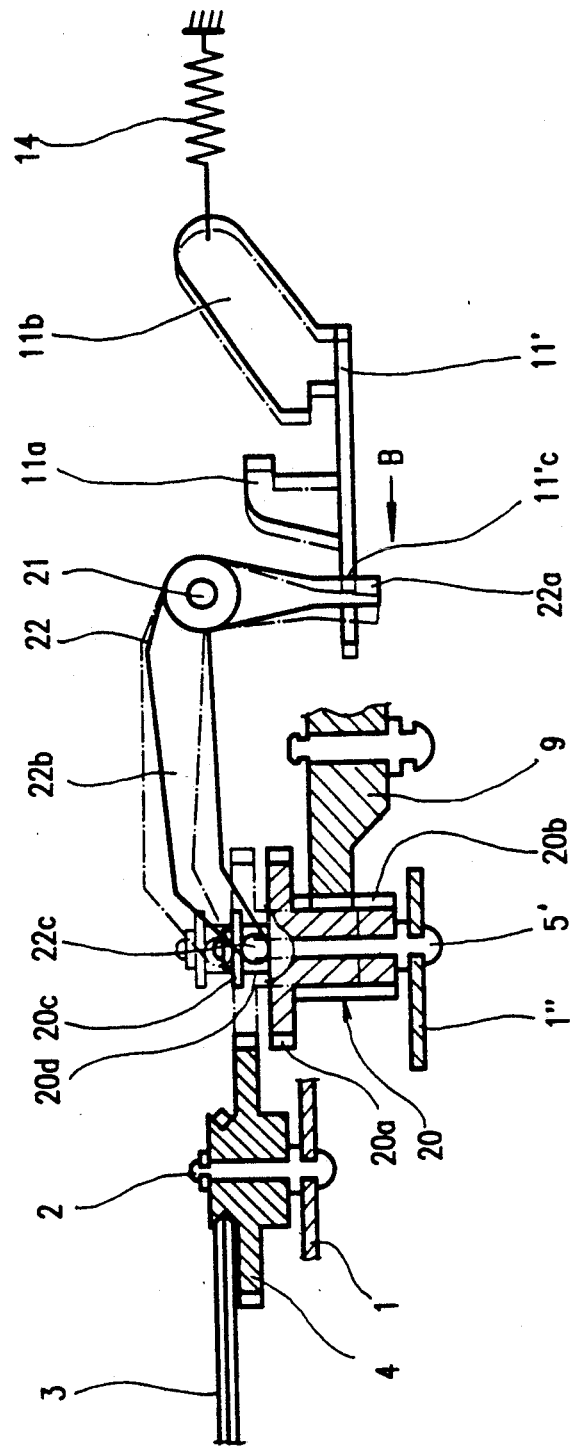
Figure 5:
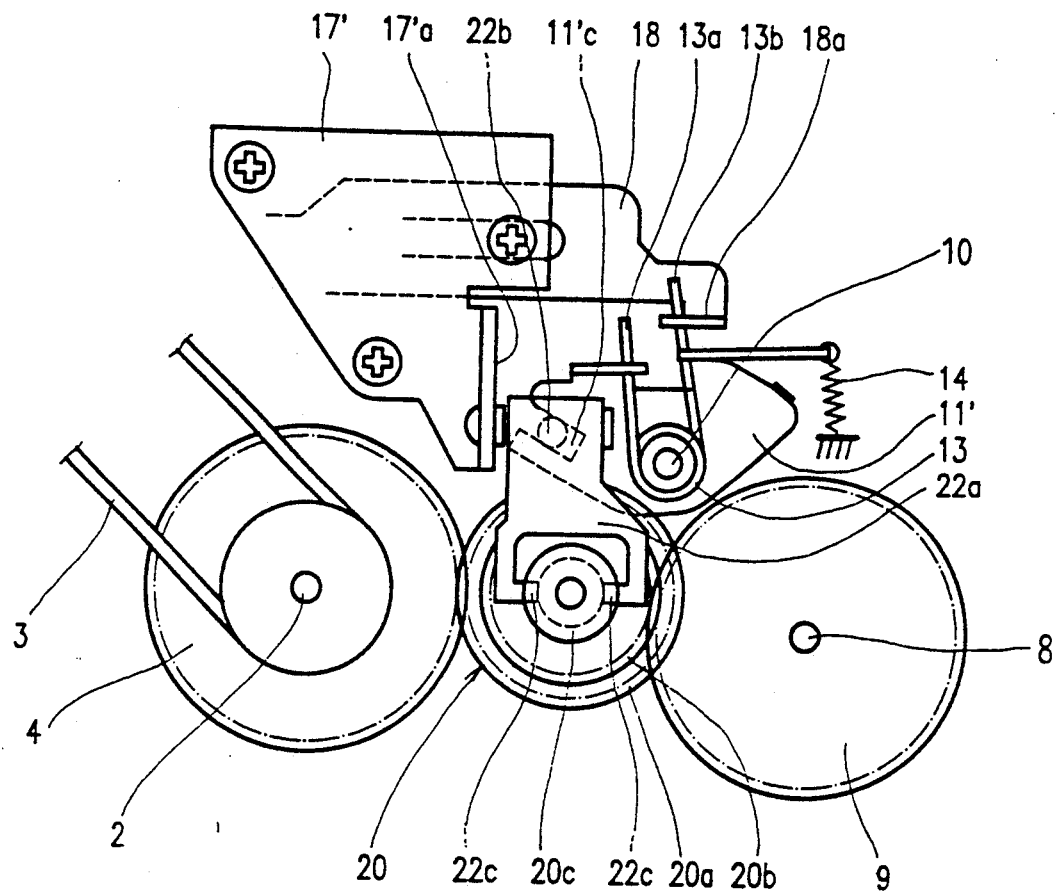
FIG. 5 is a plan view similar to FIG. 4A, showing the engagement condition of its connecting gear.

Referring to FIGS. 4A and 4B, there is shown a differential power transmission device for a tape recorder in accordance with the present invention. As shown in the drawings, the differential power transmission device includes some parts identical to those of the differential power transmission device shown in FIG. 1. Identical parts are designated by identical reference numerals, respectively.

The differential power transmission device comprises a connecting gear 20 mounted to a shaft 5' fixed to the main base 1" so as to rotate about and move vertically along the shaft 5'. The connecting gear 20 has a large diameter portion 20a selectively engaging with the pulley gear 4, a small diameter gear portion 20b integrally formed with the large diameter gear portion 20a always engaging with the driven gear 9.

The connecting gear 20 also has at its upper end a flange portion 20c integrally formed with the large diameter gear portion 20a. An annular engaging groove 20d is formed between the lower surface of the flange portion 20c and the upper portion of the large diameter gear portion 20a.

The differential power transmission device of the present invention also comprises a support plate 11' disposed adjacent to the connecting gear 20 and having the construction identical to that of the support plate 11 of the conventional device, except that it has at one end a hole 11'c.

In accordance with the present invention, a vertical pivot member 22 is pivotally mounted to a shaft 21 fixed to the recorder deck body. The vertical pivot member 22 is operatively connected to both the support plate 11' and the connecting gear 20. That is, the vertical pivot member 22 has a vertical portion 22a loosely inserted in the hole 11'c of the support plate 11 and a horizontal portion 22b connected with the connecting gear 20. The connection between the horizontal portion 22b of the vertical pivot member 22 and the connecting gear 20 is provided by a pair of horizontally spaced engaging extensions 22c which are formed at the end of the horizontal portion 22b and engaged in the groove 20d of the connecting gear 20.

With this arrangement, the vertical pivot member 22 pivots about the shaft 21 at a certain angle, according to the movement of the support plate 11', thereby causing the connecting gear 20 to move vertically. The pivotal movement of the vertical pivot member 22 is accomplished in that the vertical portion 22a of the vertical pivot member 22 is pushed by the moving support plate 11'. By this pivotal movement, the horizontal portion 22b of the vertical pivot member 22 is upwardly moved, so that its horizontal extensions 22c push up the flange portion 20c of the connecting gear 20, thereby causing connecting gear 20 to be lifted. According to the upward movement, the large diameter gear portion 20a of the connecting gear 20 is engaged with the pulley gear 4, thereby enabling the rotation force of the pulley gear 4 to be transmitted to the driven gear 9 which always engages with the small diameter gear portion 20b of the connecting gear 20.

The operation of the differential power transmission device of the present invention will now be described in detail.

FIGS. 4A and 4B show the condition that no rotation force of the pulley gear 4 is transmitted to the connecting gear 20. At this time, the foot piece 18a of the operating plate 18 is disposed apart from the torsion spring 13 so that the support plate 11' is urged to rotate clockwise about shaft 10, by virtue of the tension force of the tension coil spring 14. Accordingly, the vertical pivot member 22 in which its vertical portion 22a extends through the hole 11'c of the support plate 11' is maintained such that the extensions 22c of the horizontal portion 22b is in contact with the upper portion of the large diameter gear portion 20a, by virtue of the weight of the horizontal portion 22b. The connecting gear 20 connected at its engaging groove 20d with the extensions 22c of the vertical pivot member 22 is maintained at its lowered position where it large diameter gear portion 20a is disengaged from the pulley gear 4. As a result, the rotation force of the pulley gear 4 can not be transmitted to the connecting gear 20, thereby causing the driven gear 9 to be maintained at its stopped state.

As the operating plate 18 is moved in the direction indicated by the arrow A in FIG. 4A, according to an operation mode reversal from the above-mentioned condition, the operating plate 18 pushes the end 13b of the torsion spring 13 by its foot piece 18a. At this time, the shifted amount of the torsion spring 13 functions as the force rotating the support plate 11' anti-clockwise about the shaft 10. As the support plate 11' rotates anti-clockwise about the shaft 10 the vertical portion 22a of the vertical pivot member 22 inserted in the hole 11'c of the support plate 11 is moved in the direction indicated by the arrow B in FIG. 4B, thereby causing the vertical pivot member 22 to pivot clockwise about the shaft 21. By this pivotal movement of the vertical pivot member 22, the connecting gear 20 connected at its engaging groove 20d with the extensions 22c of the vertical pivot member 22 is lifted vertically along the shaft 5, as shown by the phantom line in FIG. 4B. Consequently, the large diameter gear portion 20a of the connecting gear 20 is engaged with the pulley gear 4, thereby enabling the rotation force of the pulley gear 4 to be transmitted to the driven gear 9.

Figure 6:
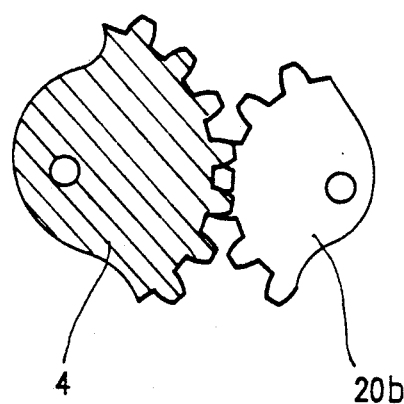
FIG. 6 is a schematic view explaining the operation of the device according to the present invention.

In the process of the engagement of the connecting gear 20 with the pulley gear 4, they may not be aligned with each other, as shown in FIG. 6. Even when this phenomenon occurs, the connecting gear 20 can be smoothly engaged with the pulley gear 4, by virtue of the fact that as the pulley gear 4 rotates continuously in clockwise or anti-clockwise, a slip is generated between the connecting gear 20 and the pulley gear 4, due to the return force of the torsion spring 13 applied to the connecting gear 20.

As apparent from the above description, the present invention provides a differential power transmission device comprising a connecting gear selectively engagable with both the pulley gear and the driven gear and vertically movable by a lifting member. Accordingly, the connecting gear can be engaged with both the pulley gear and the driven gear, only when the power transmission is desired. Thus, the rotation force of the pulley gear can be more surely transmitted to the driven gear.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A differential power transmission device for a tape recorder comprising:
   a main base;
   a pulley gear rotatably mounted to said main base and driven by drive means;
   a connecting gear rotatably mounted to the main base to move vertically for selectively engaging said pulley gear;
   a driven gear rotatably mounted to the main base to selectively receive the rotation force of the pulley gear via said connecting gear;
   lifting means adapted to vertically move the connecting gear so as to engage it with the pulley gear, so that said driven gear is driven by the rotation force of the pulley gear transmitted via the connecting gear; and
   said lifting means comprising a vertical pivot member adapted to pivotally move by the movement of a support plate, the vertical pivot member including at least one extension that reciprocates vertically in response to pivoting of said vertical pivot member so as to impart vertical movement to the connecting gear to cause the same to selectively engage or separate from said pulley gear, said lifting means including a shaft adapted to rotatably mount said vertical pivot member.

2. A differential power transmission device in accordance with claim 1, wherein said connecting gear comprises a large diameter gear portion selectively engaging with the pulley gear and a small diameter gear portion integrally rotating with said large diameter gear portion and always engaging with the driven gear.

* * * * *